(12) United States Patent
Jacobs (10) Patent No.: US 8,622,159 B2
(45) Date of Patent: Jan. 7, 2014

(54) MOTORIZED TRACKED UNIT

(76) Inventor: Jeffrey David Jacobs, Genoa, OH (US)

( * ) Notice: Subject to any disclaimer, the term of this patent is extended or adjusted under 35 U.S.C. 154(b) by 0 days.

(21) Appl. No.: 13/598,680

(22) Filed: Aug. 30, 2012

(65) Prior Publication Data

US 2013/0048393 A1 Feb. 28, 2013

Related U.S. Application Data

(60) Provisional application No. 61/575,945, filed on Aug. 31, 2011.

(51) Int. Cl.
*B62D 55/00* (2006.01)

(52) U.S. Cl.
USPC ........................................... 180/9.32

(58) Field of Classification Search
USPC ........................................... 180/9.32
See application file for complete search history.

(56) References Cited

U.S. PATENT DOCUMENTS

| | | |
|---|---|---|
| 4,483,407 A | 11/1984 | Iwamoto et al. |
| 7,311,160 B2 | 12/2007 | Lim |
| 7,316,405 B2 | 1/2008 | Kritman |
| 7,347,426 B2 | 3/2008 | Negishi |
| 7,434,815 B2 | 10/2008 | Kikusato |
| 7,520,347 B2 | 4/2009 | Chambliss et al. |
| 7,575,076 B2 | 8/2009 | Kang et al. |
| 7,600,592 B2 | 10/2009 | Goldenberg et al. |
| 7,950,673 B2 | 5/2011 | Reed et al. |
| 2011/0031045 A1 | 2/2011 | Underwood |

*Primary Examiner* — Tashiana Adams
(74) *Attorney, Agent, or Firm* — Emch, Schaffer, Schaub & Porcello Co., LPA (57) ABSTRACT

This motorized track unit is for use with a wheelchair seating system or other undefined cargo systems. The Smart Trak device is capable of carrying its intended cargo across solid or loose surfaces such as grass, mud, dirt, sand or snow. It is also capable of traversing uneven or unsteady ground surfaces and having the abilities to scale incline/declines of approved stair sets. The device itself can be outfitted with a multitude of add-ons giving it the ability to allow handicapped persons the abilities to have a full function wheelchair system that allows them to go up/down stairs.

10 Claims, 9 Drawing Sheets

MOTORIZED TRACKED UNIT

CROSS REFERENCE TO RELATED APPLICATION

The present patent application is based upon and claims the benefit of provisional patent application No. 61/575,945 filed Aug. 31, 2011.

FIELD OF THE INVENTION

The present invention relates to motorized track unit for use with a wheelchair seating system or other undefined cargo systems.

BACKGROUND OF THE INVENTION

Tracked vehicles are well known. They are generally used where the terrain is rough and unpredictable. Tracked vehicles are useful under user control, as well as for partially and fully autonomous mobile robots. One of the challenges with mobile robots is to provide a robot that can ascend and descend stairs, slopes, cross ditches, surmount certain obstacles, and generally operate over rough terrain whether moving forward or backward, turning on spot and the like.

SUMMARY OF THE INVENTION

Motorized track unit for use with a wheelchair seating system or other undefined cargo systems, The Smart Trak device is capable of carrying its intended cargo across solid or loose surfaces such as grass, mud, dirt, sand or snow. It is also capable of traversing uneven or unsteady ground surfaces and having the abilities to scale incline/declines of approved stair sets, The device itself can be outfitted with a multitude of add-ons giving it the ability to allow handicapped persons the abilities to have a full function wheelchair system that allows them to go up/dawn stairs in both public and private settings. It can also be outfitted for use in the robotic fields, EOD/Military fields, commercial fields for cargo transportation, etc. Its use of an actuator to "engage" the track system and another to articulate the tracks to full length give it the ability to be useful in many different situations. It has, the ability to rotate the seat system/cargo forward and back to compensate for weight distributions and keep the inline cent of gravity in proportion to the angles of travel thus giving it the ability, to traverse stairs and other uneven terrain.

Other objects and advantages of the present invention will become apparent to those skilled in the art upon a review of the following detailed description of the preferred embodiments and the accompanying drawings.

DETAILED DESCRIPTION OF THE INVENTION

The invention is a tracked device, which includes (a) a main carrier frame; (b) a battery containment area carried on the main carrier frame; and (c) a motor controlled movement system for use with a seating system or for use with other implementable systems, which is attached to the main carrier frame.

Figure 1:
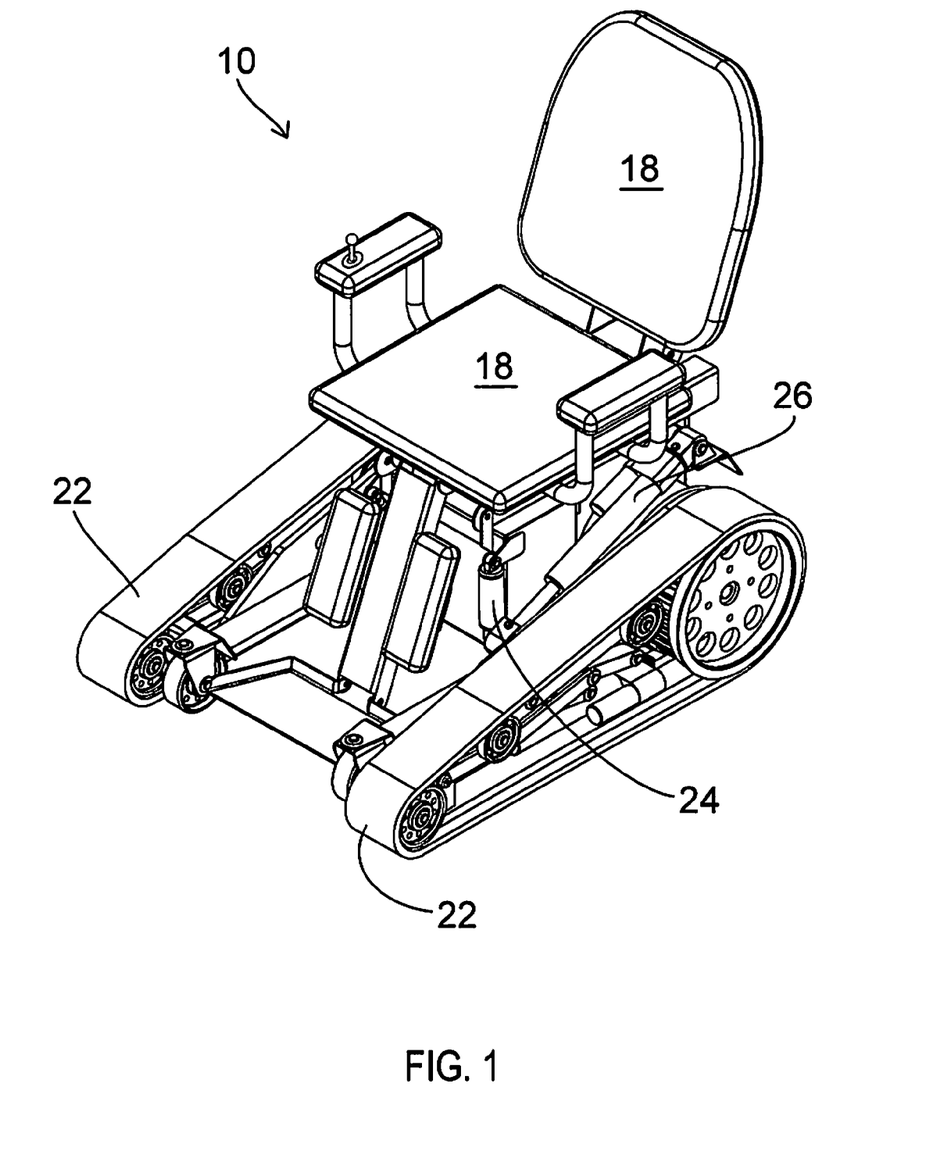
FIG. 1 is a perspective view of the motorized track unit of this invention including a wheel chair mounted thereon.

FIG. 1 is a perspective view of the motorized track unit of this invention including a wheel chair mounted thereon. The device is carried on the main carrier frame for use in transporting persons or equipment (such as a wheelchair seat system or other structural device. This allows the movement of the system to articulate as needed to offset weight distributions and counter balance the devices movement during normal and off center axis operations (such as when going up/down stairs or across uneven ground). A pair of side motion units is used to raise/lower the attached track devices connected to the carrier frames. Each side has an actuator system that will allow the attached track device to articulate into a "raised" or "lowered" position in order to position the tracked unit into the needed position for use.

Figure 2:
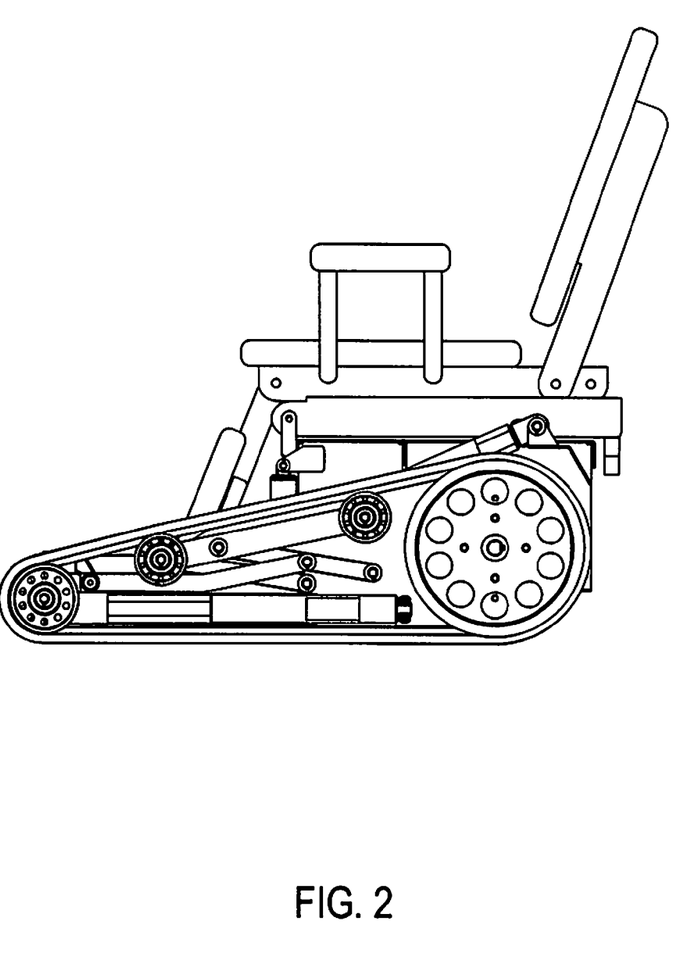
FIG. 2 is a side view of the embodiment shown in FIG. 1.

FIG. 2 is a side view of a embodiment shown in FIG. 1. FIGS. 1 and 2 also show a pair of endless ground engaging tracks with one track located within an assembly adjacent each side of the main carrier frame, where in each track is entrained around a rotatable rear drive member and a pair of rotatable idlers carried on each side of the frame, wherein the idlers comprise a front idler and a trailing idler behind the front idler, the rear drive member of each track being operatively driven by the prime mover to propel the frame via the tracks, The Figs. also show a pair of idler supports with one idler support located adjacent each side of the frame, wherein the idler supports are pivotally carried on the frame for rotation about an idler support pivot axis.

Figure 3:
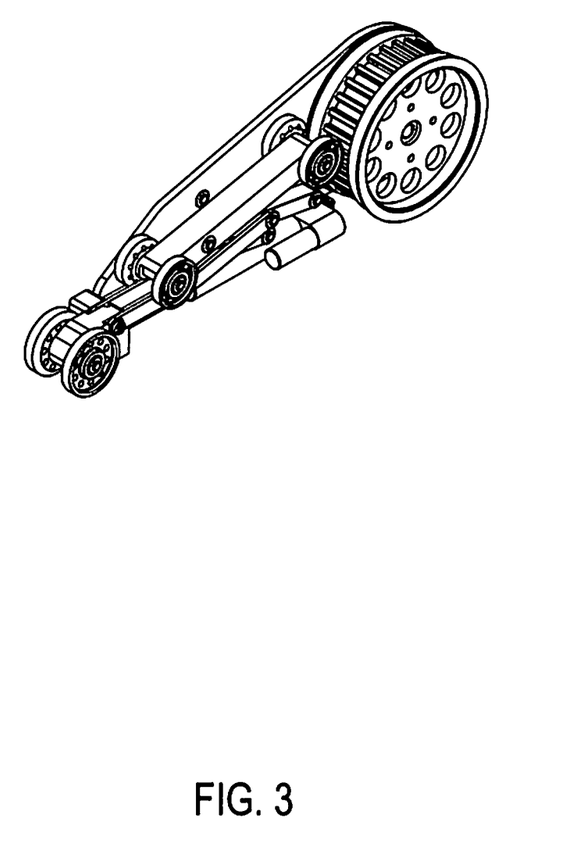
FIG. 3 is a perspective view showing an assembly that includes the drive member and rotatable idlers of this invention.

FIG. 3 is a perspective view showing an assembly that includes the drive members and rotatable idlers of this invention in greater detail. The front idlers are a pair of multi-directional wheels having a first, raised position above a plane of a contact area, and a second lowered position at or below the plane of the contact area. The tension trailing idlers are a pair of multi-directional wheel assemblies consisting of one or many idler wheels in which having a first, raised position above a plane of contact area, and a second, lowered position below the plane of contact area.

Figure 4:
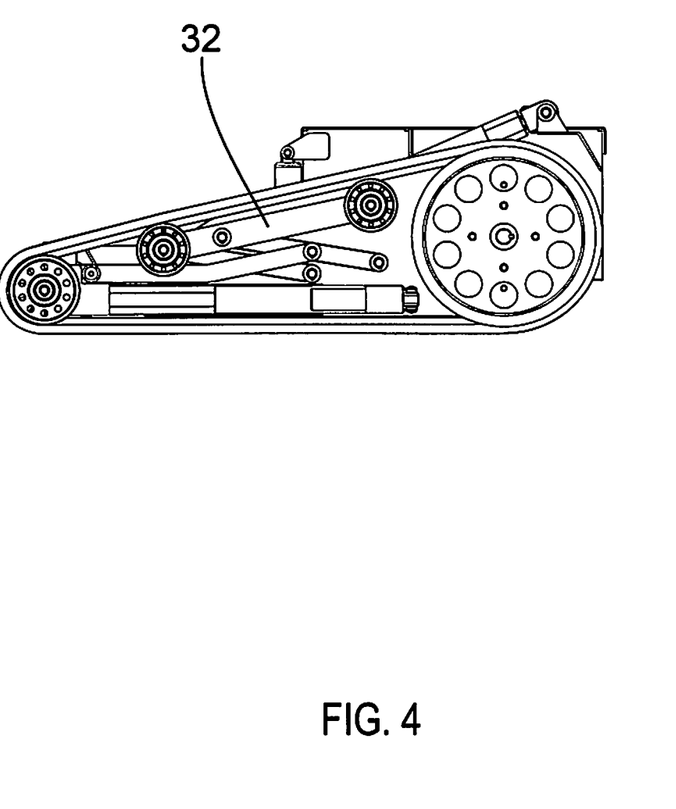
FIG. 4 is a side view of the embodiment shown in FIG. 3 including an endless ground engaging track.

FIG. 4 is a side view of the embodiment shown in FIG. 3 including an endless ground engaging track. The prime mover shown in FIG. 1 is a controller for controlling the speed and direction or rotation of the rotatable rear drive member. FIG. 2 also shows a power supply such as a battery and microprocessor. The battery and microprocessor are used in combination with the controller shown in FIG. 1.

Figure 5:
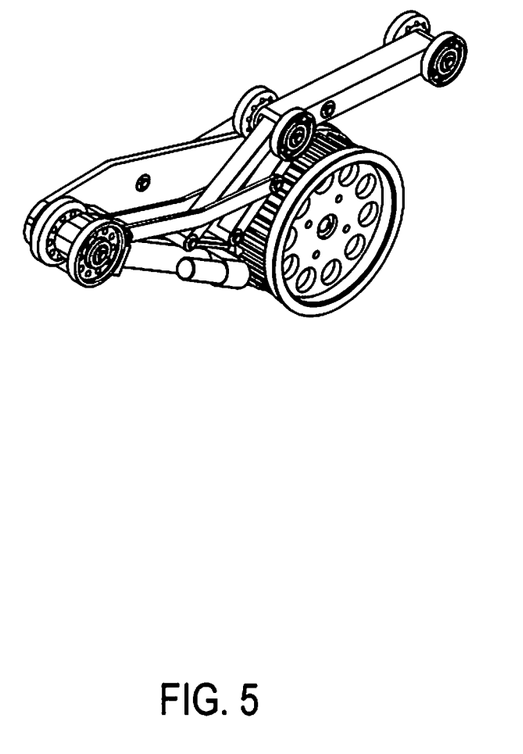
FIG. 5 is a perspective view of the embodiment shown in FIG. 3 including an idler support located on the side of the frame.

FIG. 5 is a perspective view of the embodiment shown in FIG. 3 including an idler support located on the side of the frame. A controller moves the front idlers from between a first raised position above a plane of contact area and a second, lowered position below the plane of the contact area. The controller also moves the rear idlers from between a first raised position above a plane of a contact area and a second, lowered position below the plane of the contact area.

Figure 6:
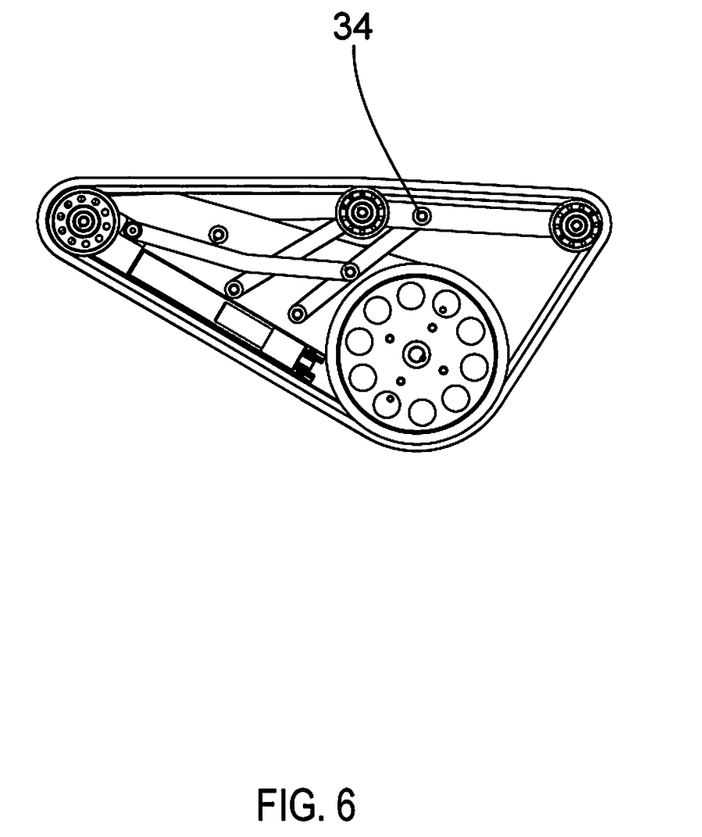
FIG. 6 is a side view of the embodiment shown in FIG. 5 including an endless ground engaging track.

FIG. 6 is a side view of the embodiment shown in FIG. 5 including an endless ground engaging track.

Figure 7:
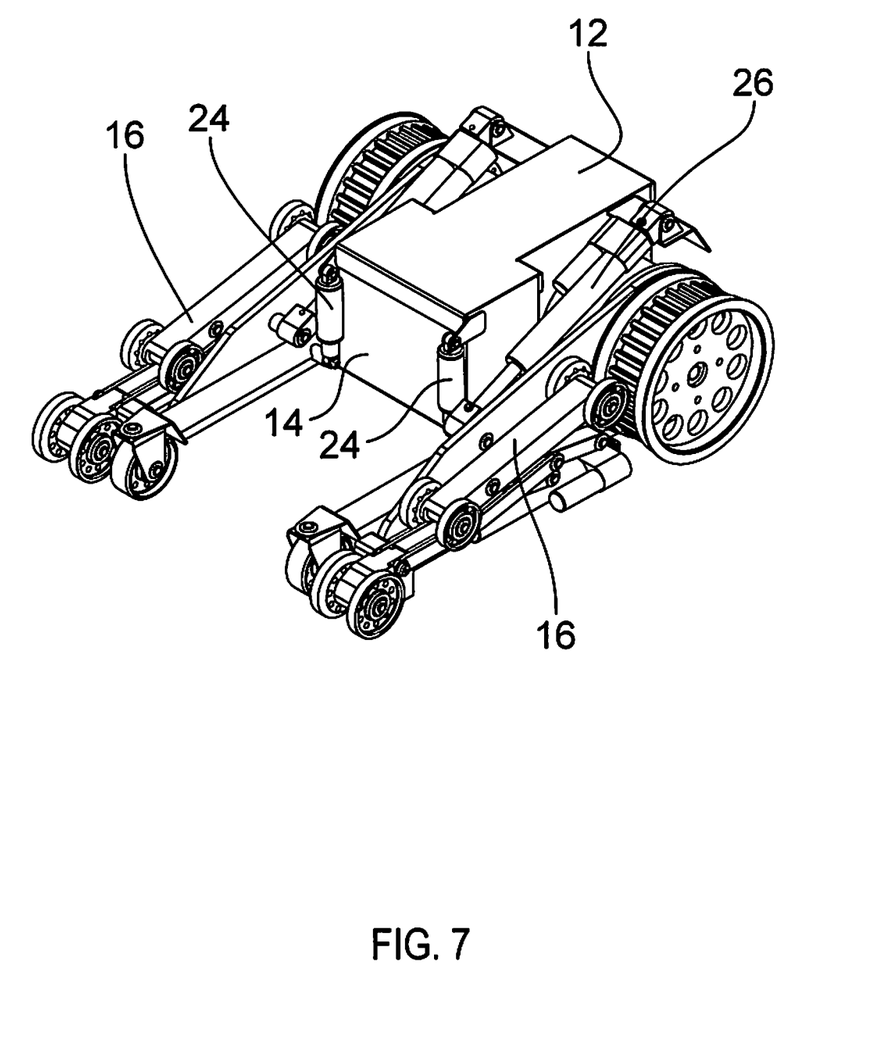
FIG. 7 is a perspective view showing a pair of idler supports located on each side of the frame.

FIG. 7 is a perspective view showing a preferred embodiment of a pair of idler supports located on each side of the frame. The auxiliary wheels and arms are attached to the frame The auxiliary wheels are configured for climbing or descending stairs or other obstacles.

Figure 8:
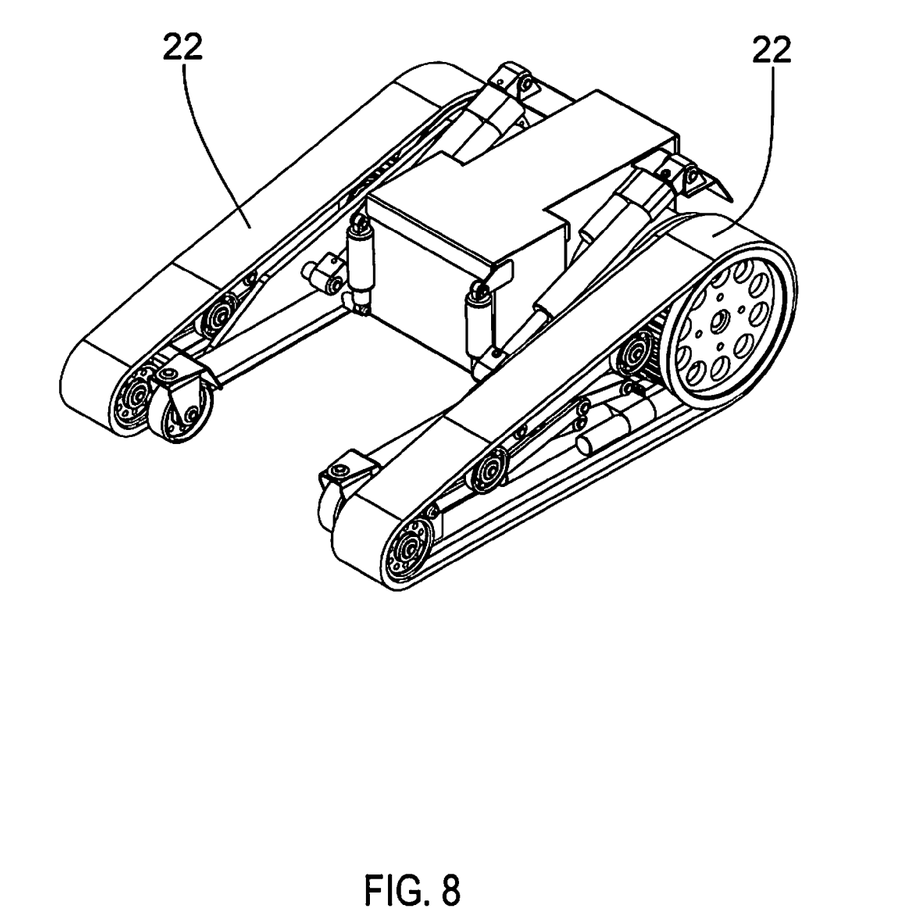
FIG. 8 is a perspective view of the embodiment of FIG. 7 including an endless ground engaging track on each idler support.

FIG. 8 is a perspective view of the embodiment of FIG. 7 including an endless ground engaging track on each idler support.

Figure 9:
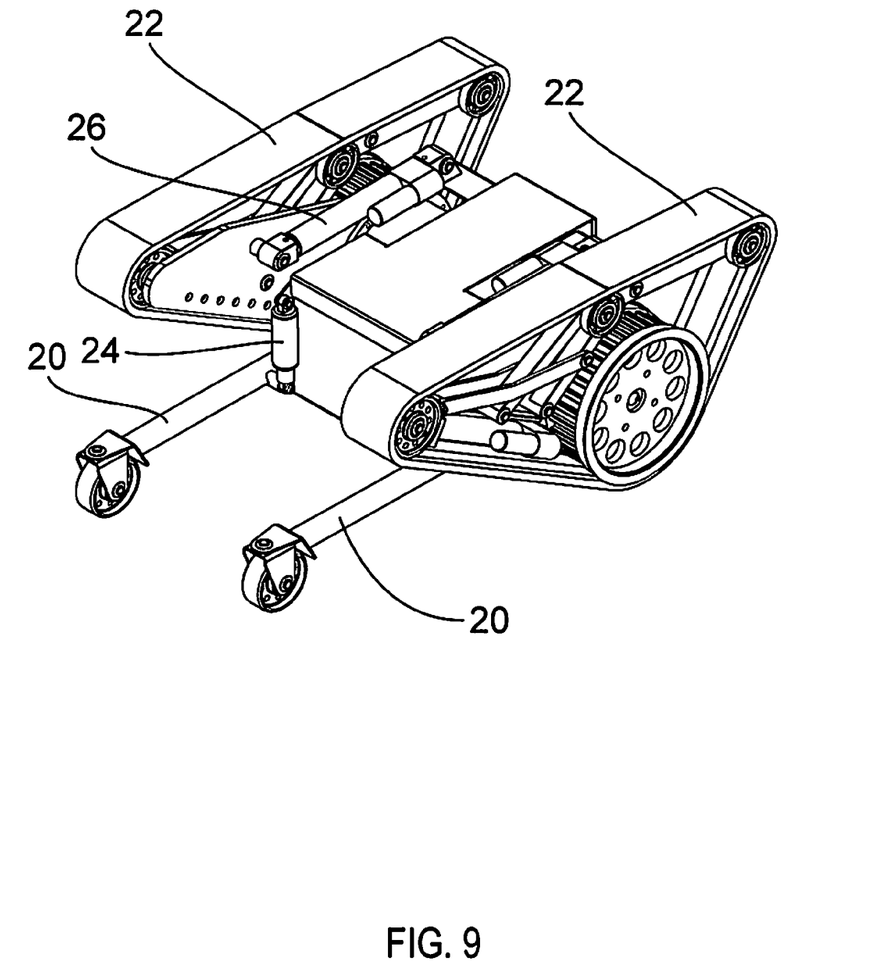
FIG. 9 is a perspective view showing another embodiment including a pat auxiliary wheels and arms wherein the arms are attached to the frame.

FIG. 9 is a perspective view showing another embodiment including a pair of auxiliary wheels and arms wherein the arms are attached to the frame.

In the preferred embodiment, the device carried on the frame is a wheel chair. The device is configured for climbing or descending stairs or other obstacles. The device darned on the frame is configured to remain parallel to the plane of the contact area when the device climbs or descends stairs or other obstacles.

The above detailed description of the present invention is given for explanatory purposes. It will he apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A tracked device (10), which includes:
   (a) a main carrier frame (12);
   (b) a battery containment area (14) carried on the main carrier frame (12);
   (c) a motor controlled movement system (16) for use with a seating system or for use with other implementable systems, which is attached to the main carrier frame;
   (d) a device (18) carried on the main carrier frame for use in transporting persons or equipment (such as a wheelchair seat system or other structural device);
      a. allowing the movement of said system to articulate as needed to offset weight distributions and counter balance the devices' movement during normal and off center axis operations (such as when going up/down stairs or across uneven ground);
   (e) a pair of side motion units (20) used to raise/lower a pair of endless ground engaging tracks (22);
      wherein each side has an actuator system (24) that will allow the the pair of tracks (22) to articulate into a "raised" or "lowered" position in order to position the tracked unit into the needed position for use;
   (f) the pair of endless ground engaging tracks (22) having one track located within an assembly adjacent each side of the main carrier frame, where in each track is entrained around a rotatable rear drive member and a pair of rotatable idlers carried on each side of the frame, wherein the idlers comprise a front idler and a trailing idler behind the front idler, the rear drive member of each track being operatively driven by the prime mover to propel the frame via the tracks;
   (g) a pair of idler supports (26) with one idler support located adjacent each side of the frame, wherein the idler supports are pivotally carried on the frame for rotation about an idler support pivot axis;
   (h) wherein the front (28) and trailing idlers (30) in each pair of idlers (26) are rotatably journaled on one of the idler supports for rotation about a front idler axis and a trailing idler axis, respectively, carried on the idler support, wherein the front idler axis an the trailing idler axis are fixed relative to the idler support with the idler support pivot axis being located between the front and trailing idler axis; being located between the front an trailing idler axes;
   (i) a pair of hangers (32) movably connected to the frame with one hanger being adjacent each side of the frame, wherein each idler support is carried on one of the hangers such that the idler support pivot axis moves with the hanger;
   (j) a fastener (34) connected to each hanger for fixing the hanger in a stationary operational position on the frame with the track being tensioned around the rear drive member and the idlers; and
   wherein the device (18) carried on the frame is configured to remain parallel to the plane of the contact area when the tracking device (10) climbs or descends stairs or other obstacles.

2. A tracked device according to claim 1 wherein the front idlers are a pair of multi-directional wheels having a first, raised position above a plane of a contact area, and a second lowered position at or below the plane of the contact area.

3. A tracked device according to claim 1 wherein the tension trailing idlers are a pair of multi-directional wheel assemblies consisting of one or many idler wheels in which having a first, raised position above a plane of contact area, and a second, lowered position below the plane of contact area.

4. A tracked device according to claim 1 wherein the prime mover further comprises a controller for controlling the speed and direction or rotation of the rotatable rear drive member.

5. A tracked device according to claim 1 further comprising a controller for moving the front idlers from between a first raised position above a plane of a contact area and a second, lowered position below the plane of the contact area.

6. A tracked device according to claim 1 further comprising a controller for moving the rear idlers from between a first raised position above a plane of a contact area and a second, lowered position below the plane of the contact area.

7. A tracked device according to claim 1 wherein the device carried on the frame is a wheel chair.

8. A tracked device according to claim 1 configured for climbing or descending stirs or other obstacles.

9. A tracked device according to claim 1 further comprising an auxiliary wheel and an arm wherein the arm is attached to the frame.

10. A tracked device according to claim 9 wherein the auxiliary wheel is configured for climbing or descending stairs or other obstacles.

* * * * *